United States Patent [19]

Topham

[11] 3,824,962

[45] July 23, 1974

[54] FEED TROUGH WITH REPLACEABLE BOTTOM

[76] Inventor: Arnold J. Topham, P.O. Box 355, Booneville, Ark. 72927

[22] Filed: May 8, 1973

[21] Appl. No.: 358,270

[52] U.S. Cl................... 119/61, 119/52 R, 119/58
[51] Int. Cl............................................ A01k 05/00
[58] Field of Search............. 119/61, 65, 68, 69, 58, 119/20, 52 R

[56] References Cited
UNITED STATES PATENTS

| | | | |
|---|---|---|---|
| 1,974,867 | 9/1934 | Hawkins | 119/58 X |
| 2,737,152 | 3/1956 | Du Rall | 119/52 R |
| 2,742,877 | 4/1956 | Stoner | 119/61 |
| 2,830,558 | 4/1958 | St. Pierre | 119/61 X |
| 3,015,307 | 1/1962 | Johnson et al. | 119/61 |
| 3,067,723 | 12/1962 | Norwood | 119/58 |
| 3,191,582 | 6/1965 | Smoker | 119/61 |
| 3,249,090 | 5/1966 | Ripley | 119/52 R |

Primary Examiner—James H. Czerwonky
Attorney, Agent, or Firm—Clarence A. O'Brien; Harvey B. Jacobson

[57] ABSTRACT

An elongated trough, including opposite end and sidewalls, and longitudinally spaced transversely extending brace members secured between the trough sidewalls. One end wall of the trough terminates downwardly above a horizontal plane containing the upper surfaces of the brace members and an elongated bottom wall is lengthwise receivable beneath the one end wall for positioning on and support from the transverse brace members. The one sidewall includes upwardly retractable abutment means disposed in registry with the adjacent end of the bottom wall to releasably prevent endwise retraction of the bottom wall beneath the one end wall of the trough and the trough includes longitudinally spaced legs supported from opposite sides thereof and the lower ends of the legs on each side of the trough are interconnected by means of horizontal runner members. Further, the opposite ends of the trough include towing eyes whereby a plurality of troughs may be towed in train fashion and the legs and the runners supported therefrom are releasably supported from the trough.

6 Claims, 5 Drawing Figures

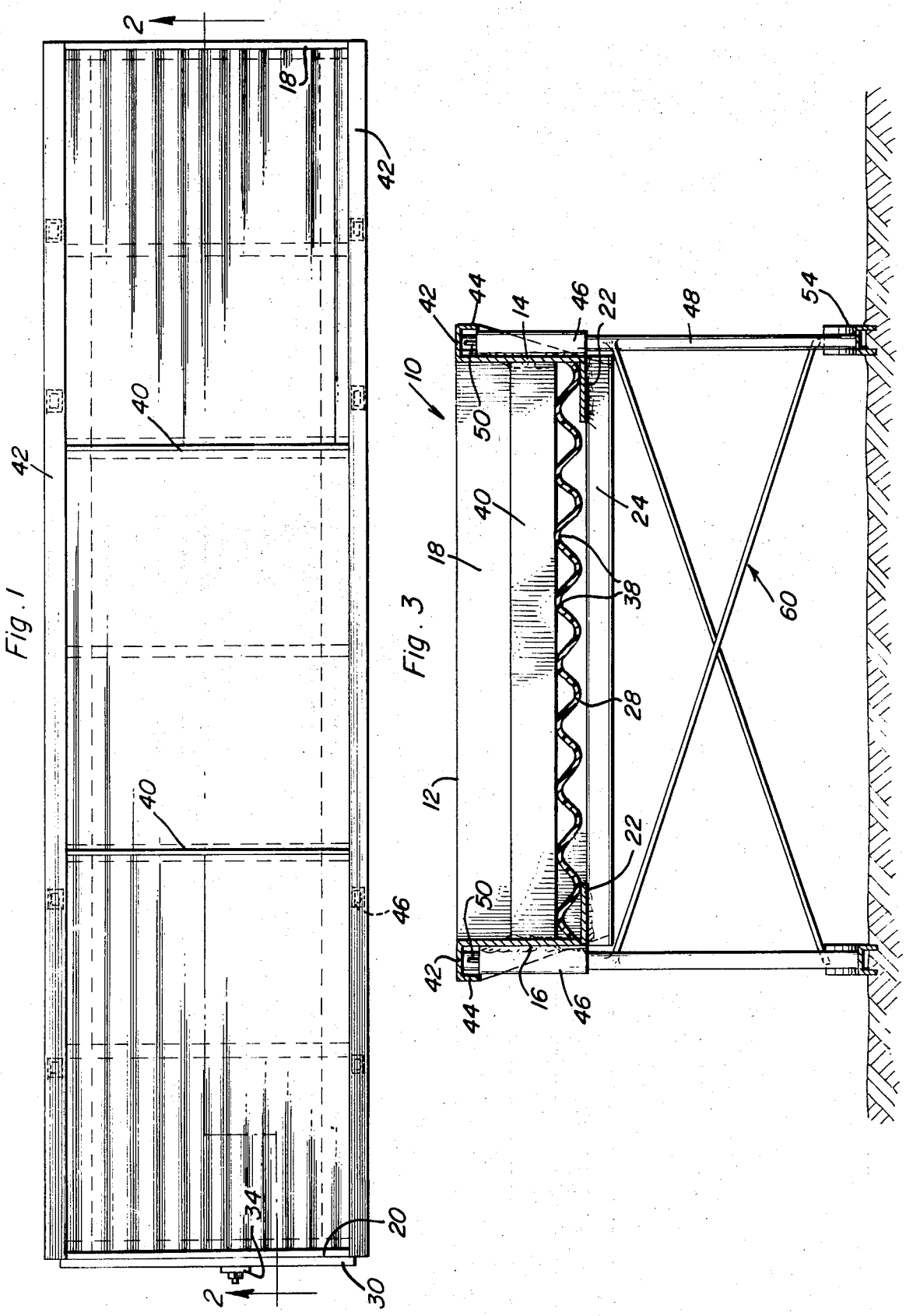

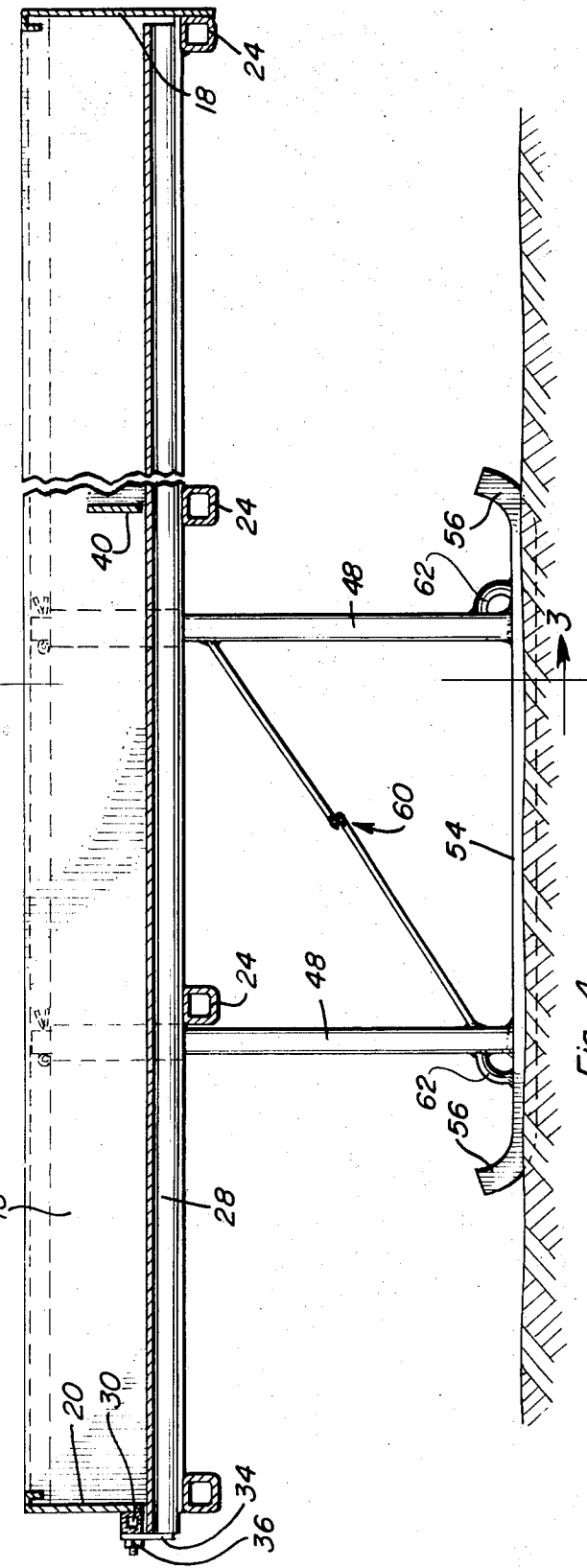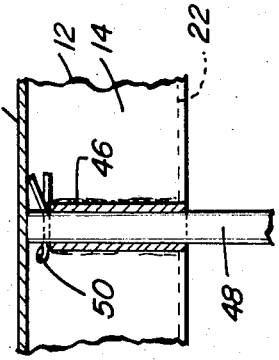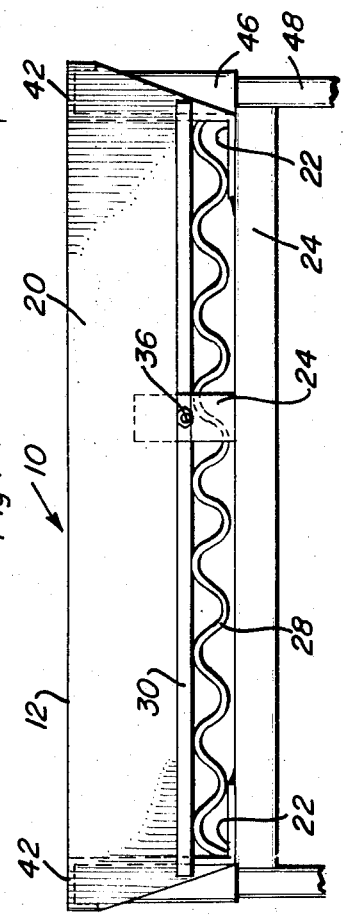

FEED TROUGH WITH REPLACEABLE BOTTOM

The trough of the instant invention is designed primarily as a feed trough. However, the trough may be constructed of greater width and utilized as a hay rack.

The trough includes a lengthwise retractable bottom wall including longitudinally extending corrugations for drainage and the plan dimensions of the trough will be such to accept standard size width and length corrugated bottom panels (double or triple width corrugated bottom panels being utilized when the trough is constructed of greater dimensions for use as a hay rack).

The main object of this invention is to provide a feeding trough of lightweight construction and that may be readily towed from one location to another. In some areas, feed troughs may not be needed for reasonably long periods and may be stored. However, during periods (perhaps infrequent) when there is a cover of snow on the ground, it is desirable to move feeding troughs from their storage locations to areas from which stock can be fed. The lightweight construction of the feed trough facilitates ease in handling, storing and transporting the feed trough to the stock to be fed.

Another object of this invention is to provide a lightweight feed trough supported on skids or runners and with the feed troughs including opposite end towing eyes whereby a plurality of feed troughs may be anchored together in train fashion and towed from a storage area to an area of use.

Yet another object of this invention is to provide a storage trough including removable legs whereby the troughs may be compactly stored.

Another important object of this invention is to provide a feed trough with a readily removable and replaceable bottom wall.

A final object of this invention to be specifically enumerated herein is to provide a feed trough in accordance with the preceding objects and which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a feed trough constructed in accordance with the present invention;

FIG. 2 is a fragmentary enlarged, longitudinal, vertical sectional view, taken substantially upon the plane indicated by the section line 2—2 of FIG. 1;

FIG. 3 is a transverse vertical sectional view taken substantially upon the plane indicated by the section line 3—3 of FIG. 2;

FIG. 4 is a fragmentary end elevational view of one end of the feed trough; and

FIG. 5 is a fragmentary vertical sectional view illustrating the manner in which the upper ends of the legs of the trough are releasably supported from the sidewalls thereof.

Referring now more specifically to the drawings, the numeral 10 generally designates the feed trough of the instant invention defining an elongated receptacle 12 comprising a hollow body including opposite sidewalls 14 and 16 interconnected at corresponding ends by means of end walls 18 and 20. The lower marginal edge portions of the sidewalls 14 and 16 terminate downwardly in horizontally inwardly directed integral flanges 22 and the flanges 22 are rigidly interconnected by means of longitudinally spaced transversely extending braces 24 secured to the underside surfaces of the flanges 22.

The end wall 18 projects downwardly below the lower marginal edge portions of the sidewalls 14 and is secured to the opposing upstanding face of the adjacent longitudinal side of the near brace 24.

The end wall 20 terminates downwardly a spaced distance above a horizontal plane containing the upper surfaces of the transverse brace members 24 and a lengthwise corrugated bottom wall 28 is lengthwise inserted beneath the end wall 20 into position above and supported from the upper surfaces of the transverse braces 24. The lower marginal edge portion of the end wall 20 includes an outer reinforcing member 30 secured thereto and at its opposite ends to the adjacent ends of the sidewalls 14 and 16. The reinforcing member 30 has an elongated abutment strap 34 pivotally secured thereto as at 36. The abutment strap 34 is swingable into and out of position in registry with the adjacent end of the bottom wall 28 so as to releasably prevent lengthwise withdrawal of the bottom wall 28.

It will, of course, be noted that the bottom wall 28 includes longitudinal corrugations 38 and in this manner rain water falling into the trough may settle to the upper surface of the bottom wall 28 and drain longitudinally therealong beneath the feed within the trough 10.

A pair of horizontally elongated edge upstanding bars 40 are secured between the sidewalls 14 and 16 above the bottom wall 28 and prevent upward movement of the bottom wall 28. Further, the upper marginal edge portions of the sidewalls 14 and 16 terminate in horizontally outwardly directed flanges 42 and the flanges 42 in turn terminate outwardly in vertically short down turned flanges 44 so as to form downwardly opening longitudinal channels extending along the outer surfaces of the upper marginal edge portions of the sidewalls 14 and 16.

Each of the sidewalls 14 and 16 includes two pairs of upstanding sleeves 46 secured to its outer surface and a pair of upstanding legs 48 have their upper ends telescoped upwardly through each pair of sleeves 46 with the upper terminal ends of the legs received in the channels defined between the sidewalls 14 and 16 and the corresponding flanges 44. Those upper terminal ends of the legs 48 disposed above the sleeves 46 have locking abutment pins 50 removably secured therethrough so as to prevent downward movement of the legs relative to the sleeves 46. Further, the upper ends of the legs 48 abut the undersurfaces of the flanges 42.

The lower ends of each pair of legs 48 are interconnected by means of an inverted horizontal channel member 54 having upwardly curving opposite ends 56 and defining a runner. Further, the legs of each of legs 48 are cross-braced relative to the corresponding pair of legs on the opposite side of the feed trough 10 by means of a bracing assembly 60. Thus, the two pairs of opposite side legs at each end portion of the feed trough 10 are braced together as an integral unit that may be readily removed from the feed trough 10 after the pins 50 have been removed.

The front and rear ends of the front and rear pairs of runners 54, respectively, include anchor eyes 62 and any suitable means may be utilized to anchor adjacent anchor or towing eyes 62 of a plurality of end aligned troughs 10 together in order that a plurality of the troughs 10 may be towed behind a tractor from one location to another. The runners 54 enable the troughs to be readily towed over different ground surfaces and covers with ease and without side slipping of the troughs 10.

The bottom wall 28 may be conveniently constructed of fiber glass or other material which will not corrode and each trough, without its leg assemblies, may be readily lifted and handled by a single person. Still further, the length and width dimensions of the troughs may be varied as desired, and the vertical height of the legs 48 may also be varied according to the intended usage of the trough 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated receptacle comprising a hollow body including upstanding opposite side and opposite end walls, said end walls extending and secured between corresponding ends of said sidewalls, a bottom wall, means mounted on said receptacle and supporting said bottom wall in position extending between said side and end walls and closing the bottom of said receptacle, said sidewalls terminating upwardly in horizontally outwardly directed flanges, longitudinally spaced upstanding sleeves secured to the outer surfaces of each of said sidewalls a spaced distance below said outwardly directed flanges, longitudinally spaced pairs of opposite side upstanding leg members having means rigidly bracing said leg members relative to each other, the upper ends of said legs being removably slidingly received through said sleeves with the upper terminal ends of said legs disposed above said sleeves and abutted against the undersides of said outwardly directed flanges, and abutment means removably mounted on the upper terminal ends of said leg members above the sleeves preventing downward removal of said leg members from said sleeves.

2. The combination of claim 1 wherein said supporting means comprises said sidewalls terminating downwardly in generally horizontally inwardly projecting support flanges from which the opposite side marginal portions of said bottom wall rest.

3. The combination of claim 2 wherein the opposite ends of said braces are secured to the under sides of said support flanges.

4. The combination of claim 1 wherein said bottom wall includes transversely spaced longitudinally extending corrugations.

5. The combination of claim 1 including a plurality of elongated brace members spaced longitudinally of said receptacle and extending and secured between the lower marginal portions of said sidewalls with the upper surfaces of said brace members disposed at least generally in the same plane, at least one of said end walls terminating downwardly in a generally horizontal plane spaced above the first mentioned plane, said elongated bottom wall being lengthwise removably inserted beneath said one end wall and over said brace members between said side walls, said one end wall including upwardly retractable latch means disposed immediately outwardly of and in horizontal alignment with the adjacent end of said bottom wall.

6. The combination of claim 1 including elongated opposite side horizontal runners extending longitudinally of said receptacle and from which the lower ends of the legs on the corresponding sides of said receptacle are supported.

* * * * *